June 24, 1930.                M. TIBBETTS                1,766,849
                              BRAKE MECHANISM
                            Filed March 21, 1928
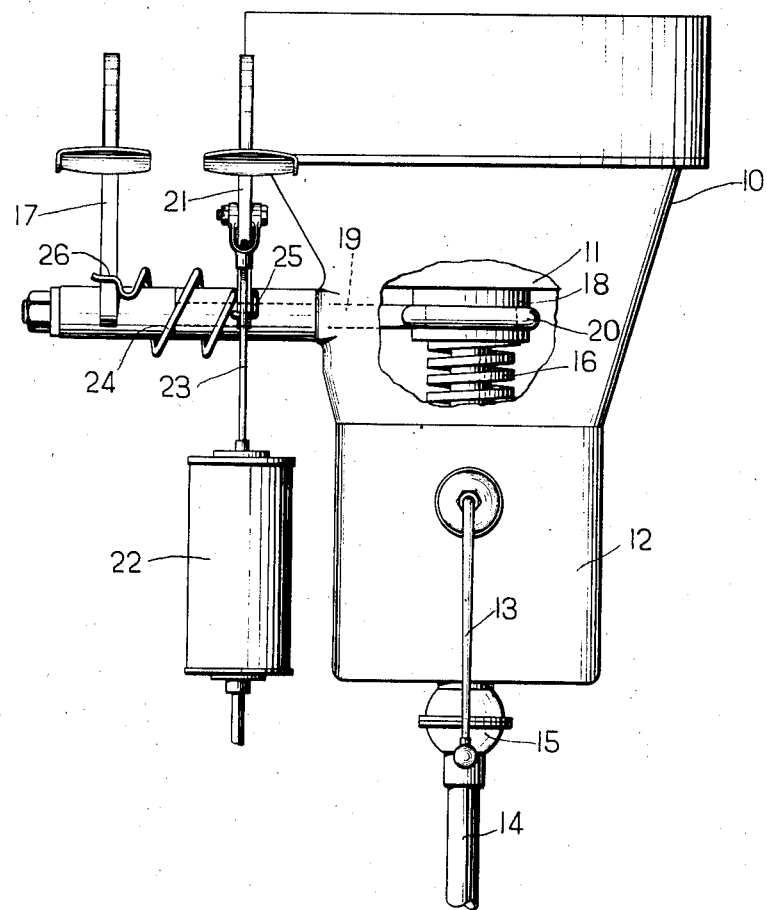
Inventor
Milton Tibbetts

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

BRAKE MECHANISM

Application filed March 21, 1928. Serial No. 263,304.

This invention relates to motor vehicles and more particularly to the clutch and brake mechanism.

Before the advent of self-energizing, servo and power brakes for motor vehicles, the force required to brake the vehicle by the operation of the usual foot lever provided for the purpose was great enough to impose something of a burden upon the operator of the vehicle due to the fact that the braking force depended entirely upon the pressure applied to the brake lever by the operator. This burden, however, has been lightened to various extents by the adaptation of self-energizing, servo and power brakes to motor vehicles since with these types of brakes, the pressure on the foot lever necessary for braking is generally less than the pressure required when such brakes are not employed. This is true to the greatest extent with power brakes, such as air pressure or vacuum operated brakes where the foot lever merely serves to operate a valve controlling the brakes, the pressure on the foot lever required to apply the brakes with this system being relatively very small.

But whereas the force necessary to be applied to the brake lever may be reduced to very low limits by the use of power brakes, or the like, the extent to which the force may be reduced that is required to release the clutch of the vehicle by operating the clutch lever is decidedly limited. The factors determining this limit are the clutch pressure spring and the length of the effective or operative path of travel of the clutch lever or pedal. The clutch pressure spring must be of sufficient strength to prevent slipping of the clutch when engaged and the overall length of travel of the clutch lever must be short enough so that the clutch may be conveniently operated with the foot of the operator. The effective or operative length of travel is somewhat shorter than the overall length of travel of the clutch lever because of the clearance necessary between the beginning of the clutch releasing movement and the fully retracted position of the clutch. Thus the pressure that must be overcome in releasing the clutch cannot be reduced beyond a certain amount and the leverage available to overcome this pressure is limited by the shortness of the path of travel of the clutch lever.

It is apparent therefore that the force required to release the clutch by operating the clutch lever is more or less fixed or cannot be reduced beyond a certain amount while the force necessary to apply the brakes by the operation of the brake lever may be reduced to very low limits by the use of power brakes. But with power brakes, it is undesirable to have too small a resistance to the operation of the brake lever, because of the tendency toward "over-braking" or locking of the wheels. In some instances, this tendency toward "over-braking" has been lessened by "loading" the brake operating lever in some convenient manner so as to provide a greater resistance to the operation of the brake lever in applying the brakes. However, instead of loading the brake lever merely for the purpose of providing resistance to its operation, this invention provides that a part of the resistance to the operation of the clutch lever in releasing the clutch be transferred to the brake lever and thus provide sufficient resistance to the operation of the brake lever to lessen the tendency toward "over-braking" while at the same time, the operation of the brake lever will assist in releasing the clutch with the result that the force required to operate the clutch will more nearly approximate the force required to apply the brakes.

It is accordingly an object of the present invention to provide means that will assist in releasing the clutch and thus diminish the force required to disengage the clutch when the brakes are applied.

Another object of the invention is to provide means that will automatically assist in releasing the clutch when the brakes of the vehicle are applied.

Another object of the invention is to so interconnect the clutch and brakes of a motor vehicle that application of the brakes will tend to operate but will not be sufficient to release the clutch.

Another object of the invention is to so relate the operating levers of a clutch and a power operated brake that the resistance to operation of the clutch lever will approximate the resistance to operation of the brake lever.

Other objects of the invention will appear from the following description taken in connection with the drawing forming a part of this specification, in which:

The figure is a plan view of part of a motor vehicle showing the clutch and brake operating levers and other adjacent parts, embodying the invention.

Referring to the drawing, 10 represents a flywheel and clutch housing of a motor vehicle having a clutch 11 mounted therein, the clutch being of any desired type for connecting the motor crank shaft with the transmission or gear box of the vehicle. The transmission is enclosed in a housing 12 on the upper portion of which is mounted a change speed lever 13 and extending from the rear end of the housing 12 is a drive shaft 14 connected to the transmission through the usual universal joint 15. The clutch is shown as having a spring 16 adapted to normally engage the clutch friction parts, and a clutch lever or pedal 17 mounted for pivotal movement in any convenient manner, is connected with a collar 18 in any desired or suitable manner, such as by means of a shaft 19 and a shifter fork 20, for operating the clutch or moving it to its disengaged or open position, this movement taking place against the action of spring 16. The upper end of lever 17 is located so as to be engaged and operated with the foot of the operator of the vehicle.

The brakes of the vehicle are operated by a brake lever or pedal 21 mounted for pivotal movement in any suitable manner, the upper end of which is positioned so that it may be readily engaged and operated by the foot of the operator of the vehicle. The brakes may be of any desired type such as the ordinary mechanical brakes or hydraulic brakes or they may be self-energizing, servo or power brakes since the invention is adaptable to either of these types of brakes. However, the invention is particularly well adapted to power brakes, because with this type the force required to operate the brake lever or pedal is relatively very small due to the fact that the brake lever serves merely to operate a valve controlling the brakes. The brake lever or pedal 21 is connected to the power brake in any suitable manner and in the drawing, this connection and the power brake are shown more or less diagrammatically, the power brake mechanism being shown at 22 and the connection between the brake mechanism and the brake lever being shown at 23.

Disengagement of the clutch is assisted when the brakes are applied and part of the resistance to the operation or disengagement of the clutch is transferred to the brakes by interconnecting the clutch and brake levers or pedals. In the form shown, this interconnection is a spring, preferably a coiled spring 24 having one end 25 secured to the brake lever 21 and the other end 26 engaging the clutch pedal 17 so that as the brake pedal is operated to apply the brakes, the spring will be coiled and will exert a pressure on the clutch lever. The spring 24 may be placed in any convenient position or location with respect to the clutch and brake levers, but it is preferably coiled around the shaft upon which the clutch and brake levers are pivoted, or around the clutch and brake lever pivotal extensions as shown.

From the above description, it will be seen that when the brakes of the vehicle are applied by the operation of the brake pedal 21, spring 24 will be coiled by movement of spring end 25 with the brake lever and cause spring end 26 to exert a pressure on the clutch pedal 17, thus transferring a portion of the resistance to operation of the clutch lever to disengage the clutch to the brake lever when the brakes are applied. After the vehicle has been slowed down sufficiently with the brakes applied, the clutch lever is operated to release the clutch, this release being assisted by the pressure exerted by spring 24 on the clutch lever. It will be understood that spring 24, even when coiled to the greatest extent by movement of the brake lever, will never exert sufficient pressure on the clutch lever to operate the lever and disengage the clutch. In other words, the spring merely tends to operate the clutch, but is not sufficient to release the clutch when the brakes are applied.

With a motor vehicle having power brakes and having the clutch and brake levers interconnected, as described, it will be apparent that the force required to disengage the clutch will more nearly approximate the force required to apply the brakes, the closeness of the approximation depending, of course, upon the spring interconnecting the clutch and brake levers. Thus, for example, if it requires a force of only 10 pounds to operate the brake lever to apply power brakes, and 50 pounds to release the clutch, a spring adapted to exert a force of 20 pounds on the clutch lever when the brakes are applied will remove 20 pounds from the resistance to operation of the clutch and add 20 pounds to the force required to operate the brakes, making a force of only 30 pounds required to operate the clutch lever and 30 pounds to operate the brake lever. The advantages of such an equalization of the forces required on the part of the operator of the vehicle to operate the clutch and brakes will be apparent.

It will be noted that end 26 of spring 24 is not secured to the clutch lever, but preferably merely bears against the lever. This arrangement prevents the extra loading of the clutch lever that would be occasioned by uncoiling of the spring when it is necessary to release the clutch before the brakes are applied or without applying the brakes.

It will be understood that various forms of the invention other than those described above may be used without departing from the spirit or scope of the invention.

Having thus described the invention, what is claimed and desired to be secured by Letters Patent is:

1. In a motor vehicle, the combination with a clutch and a brake mechanism, of means tending but not sufficient to operate the clutch when the brake mechanism is applied.

2. In a motor vehicle, the combination with a clutch and a brake mechanism, of means interconnecting the clutch and brake tending but not sufficient to operate the clutch when the brake mechanism is applied.

3. In a motor vehicle, the combination with a clutch and a brake mechanism, of an interconnection for said clutch and brake tending but not sufficient to operate the clutch when the brake mechanism is applied.

4. In a motor vehicle, the combination with a clutch and its operating lever and a brake mechanism and its operating lever, of means interconnecting said levers tending but not sufficient to operate the clutch when the brake mechanism is applied.

5. In a motor vehicle, the combination with a clutch and a brake mechanism, of yielding means connecting the clutch and brake mechanism tending but not sufficient to operate the clutch when the brake mechanism is aplied.

6. In a motor vehicle, in combination, a clutch and a brake mechanism, and a spring connecting the clutch and brake mechanism tending but not sufficient to operate the clutch when the brake mechanism is applied.

7. In a motor vehicle, in combination, a clutch and a brake mechanism, separate operating means for the clutch and brake mechanism, and means under the control of the brake operating means tending but not sufficient to effect disengagement of the clutch.

8. In a motor vehicle, in combination, a clutch and a brake mechanism, operating means for the clutch and brake mechanism, and yielding means under the control of the brake operating means tending but not sufficient to effect disengagement of the clutch.

9. In a motor vehicle having a brake mechanism and a spring closed clutch, separate operating means for the brake mechanism and clutch and means connecting said operating means to only partially counteract the clutch spring when the brake mechanism is operated.

10. In a motor vehicle, in combination, a clutch and its operating lever, a brake mechanism and its operating lever, and a spring connecting said levers, said spring operating to exert a pressure on the clutch operating lever when the brake lever is operated to apply the brakes, the pressure exerted by the spring being at most insufficient to disengage the clutch.

In testimony whereof I affix my signature.

MILTON TIBBETTS.